United States Patent [19]

Zegel

[11] 3,889,395
[45] June 17, 1975

[54] TEACHING AID FOR ACCOUNTING

[76] Inventor: Snyder M Zegel, 108 Monell Ave., Islip, N.Y. 11751

[22] Filed: Apr. 19, 1974

[21] Appl. No.: 462,439

[52] U.S. Cl. .................................. 35/24 R; 273/1 R
[51] Int. Cl. ............................................ G09b 19/18
[58] Field of Search ...................... 35/24 R; 273/1 R

[56] References Cited
UNITED STATES PATENTS

| | | | |
|---|---|---|---|
| 678,616 | 7/1901 | Gregory | 35/24 R |
| 1,234,743 | 7/1917 | Ellis | 35/24 A |
| 1,415,278 | 5/1922 | Tod | 35/24 C |
| 1,587,391 | 6/1926 | McKee | 35/24 R X |
| 1,611,274 | 12/1926 | Larson | 35/24 A |
| 1,751,082 | 3/1930 | Grant | 35/24 R |
| 3,423,847 | 1/1969 | Barbee | 35/24 R |

FOREIGN PATENTS OR APPLICATIONS

| | | | |
|---|---|---|---|
| 824,971 | 12/1959 | United Kingdom | 35/24 R |

*Primary Examiner*—Wm. H. Grieb
*Attorney, Agent, or Firm*—Salvatore A. Alamia, Esq.

[57] ABSTRACT

A teaching device useful as an aid in teaching the principles of accounting comprising a plurality of transaction cards, each card bearing accounting indicia, and a plurality of ledger pages with each page including, in juxtaposition, a left debit pocket and a right credit pocket. Means are provided at the top of each ledger page to receive and display a title tag. In a second embodiment, a totalizer device is adapted for attachment to said ledger pages. In a third embodiment, the teaching device comprises a plurality of account totalizer devices each adapted to receive and display account title tag.

11 Claims, 12 Drawing Figures

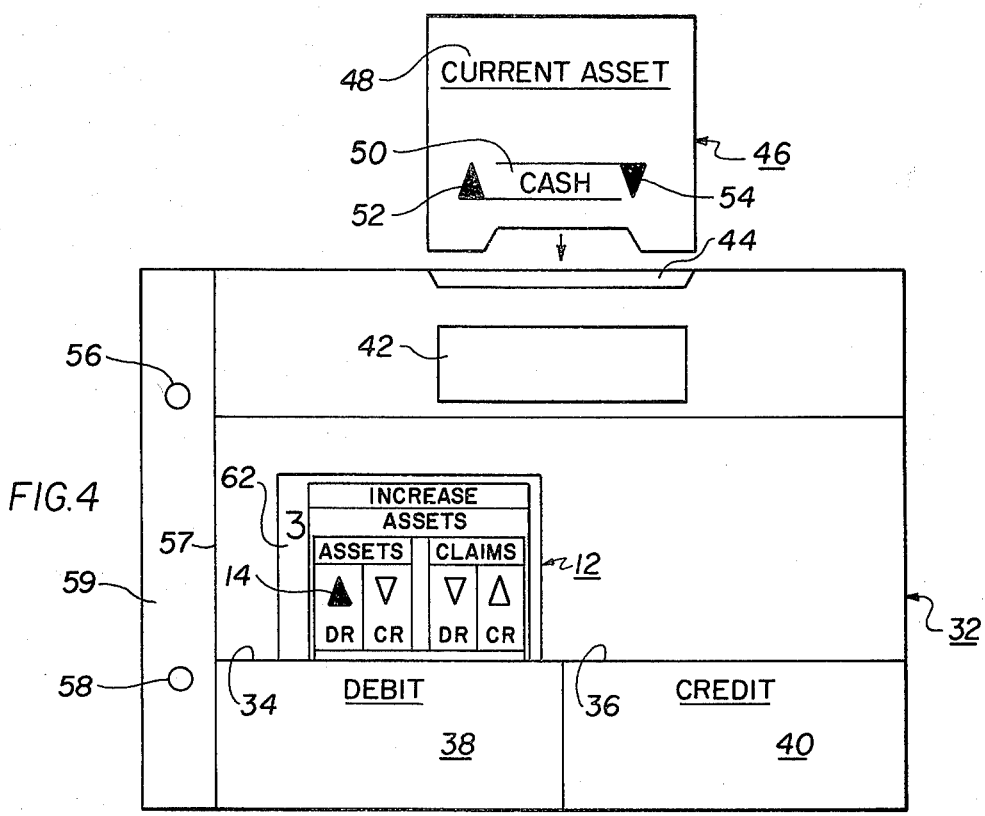
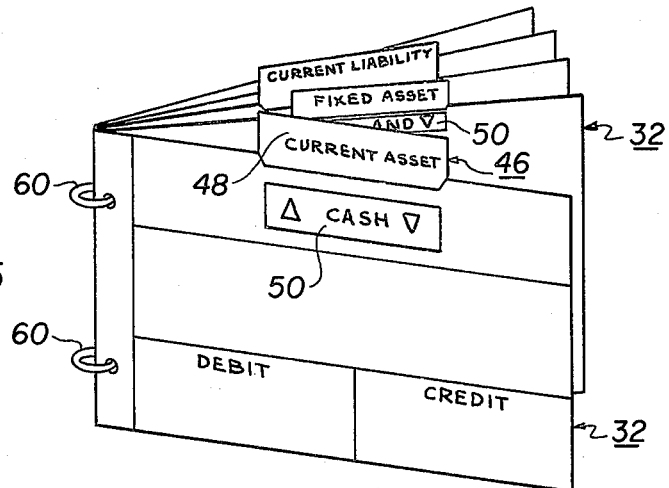
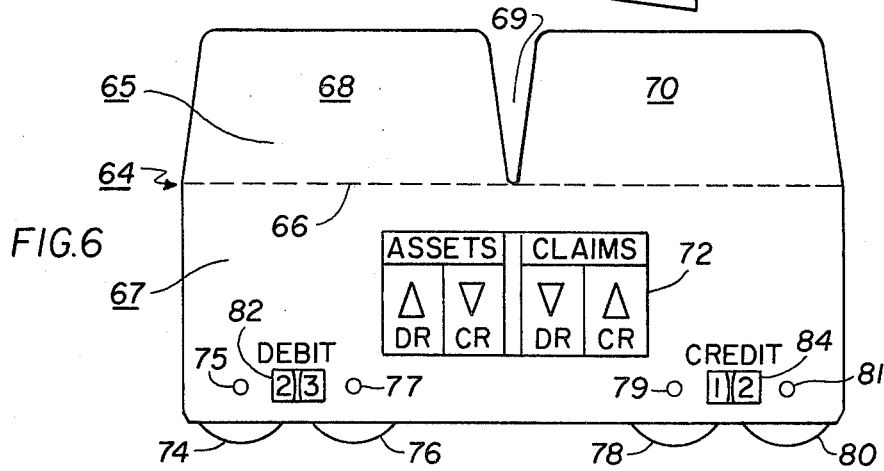

TEACHING AID FOR ACCOUNTING

This invention relates generally to a teaching aid and more particularly to a novel educational device useful as an aid in teaching the rudimentary principles of accounting. The current methods of teaching the double entry system of bookkeeping involve long and detailed formal study. Such methods may be appropriate for those who desire a career in accounting. However, with the increasing complexities in the day to day operations of most businesses, there exists the need for some teaching aid or educational device which is useful as an aid in teaching the rudimentary principles of double entry accounting for the non-professional.

The fundamental accounting equation for any business entity, stated in its simplest terms, is that its assets equals its claims. All forms of property owned by a business entity and to which one can ascribe a money value are called assets. Since credit now plays an important role in business and since credit is often extended to enable a business entity to acquire assets, the law extends to creditors a "primary" claim on the assets. The proprietorship of the business entity may then be viewed as having a "secondary" claim on the assets, i.e. a claim on the assets limited to that left after the "primary" claims have been satisfied.

In accounting, the primary claims are called liabilities and the secondary claims are called equity or capital. Stated in other words, equity or capital is a representation of the net work of a business enity, measured by the value of the assets less the value of the liabilities. Consequently, the fundamental equation stated above may be expanded to: ASSETS equal LIABILITIES plus CAPITAL.

Generally it is an object of the present invention to provide a novel teaching aid for simply and effectively demonstrating the rudimentary principles of double-entry accounting.

Specifically, it is an object of the present invention to provide a novel, game-like teaching device for illustrating the inter-relationship of assets, liabilities and capital and the several accounts that may exist under each category in different types and forms of business entities.

It is a further object of the present invention to provide a novel totalizer device for recording and displaying the accumulated amounts in the debit and credit sides of an account in a manner illustrating the interrelationship of assets and claims.

The above and other objects of the present invention are accomplished by a novel educational device comprising, in a first embodiment, a plurality of transaction cards, a plurality of ledger pages, each page adapted to receive said transaction cards, a plurality of title tags, and means provided at the top of each ledger page for receiving and displaying said title tags.

In a second embodiment, a novel educational device comprising a plurality of ledger pages, a plurality of account totalizer devices for recording and displaying the amounts in the debit and credit sides of an account, a plurality of account title tags, means provided on each ledger page for receiving and displaying said title tags.

In a third embodiment, a novel educational device for use in accounting comprising a plurality of account totalizer devices, a plurality of title tags, means at the top of each totalizer device for receiving and displaying said title tags, and means on each totalizer device for recording and displaying the accumulated amounts in the debit and credit sides on an account.

While the specification concludes with claims particularly pointing out and distinctly claiming the subject matter of the present invention, the presently preferred embodiments of the invention are described in the following detailed description taken in conjunction with the accompanying drawing in which:

FIG. 1 is a graphic representation of the fundamental accounting equation.

FIGS. 2(a)–2(b) show both sides of a debit transaction card.

FIGS. 3(a)–3(b) show both sides of a credit transaction card.

FIG. 4 illustrates a ledger page and insertable title tag with a debit transaction card positioned in the debit pocket of the ledger page in accordance with the present invention.

FIG. 5 shows a ledger comprising a plurality of the ledger pages of FIG. 4.

FIG. 6 illustrates the account totalizer device of the present invention.

Figure 1:
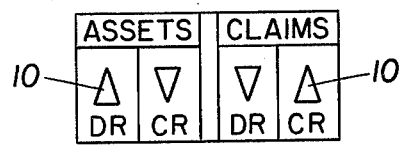

With reference to the drawing, FIG. 1 illustrates a graphic representation of the fundamental accounting equation: Assets equal Claims. It is noted that the arrowhead 10 demonstrates that an increase in Assets would be posted on the debit side of the asset account and an increase in Claims would be posted on the credit side of the claims account. Similarly, the arrowheads indicated the posting of decreases in Assets or Claims.

This graphic representation of the fundamental accounting equation utilizing arrowheads is reproduced on each transaction card 12, 22 to assist the student in understanding how each side of the equation is to be debited or credited.

Figures 2A, 2B:
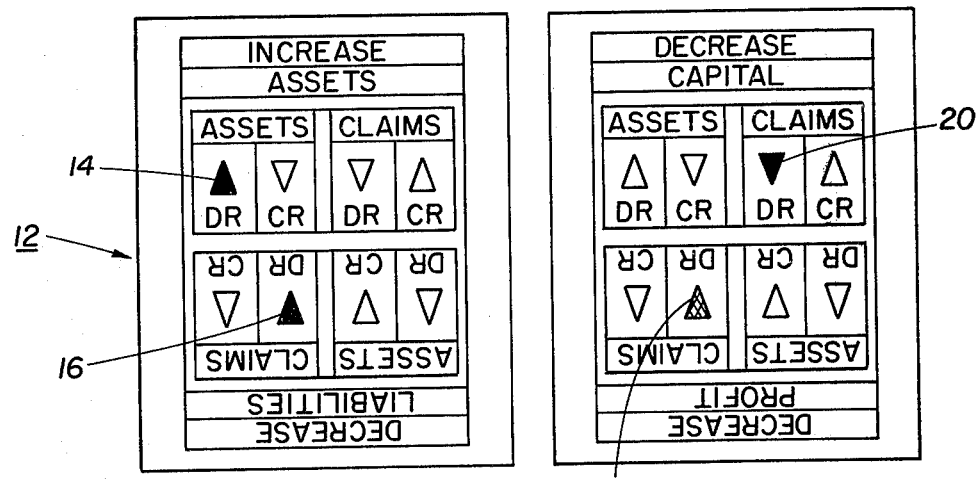

Both sides of a debit transaction card 12 are illustrated in FIG. 2. Side (a) shows an increase in assets and a decrease in liabilities. Side (b) shows a decrease in capital and a decrease in profits. The arrowhead 14 representing an increase in assets (debit) is colored or otherwise filled-in to clearly demonstrate to the student that when a transaction calls for an increase in assets such increase is to be posted on the debit or left side of the particular asset account. Similarly, indication arrowsheads 16, 18 and 20 demonstrate that decrease in liabilities, capital or profit are to be "debited". As a further aid to the student, although not essential to the present invention, all indicating arrowheads for assets are to be colored or filled-in in a manner clearly distinguished from that for claims indicating arrowheads. In addition, indicating arrowheads representing an increase or decrease in temporary accounts such as profit, income or expenses, may be cross-hatched or striped. (See arrowheads 18,28)

Figures 3A, 3B:
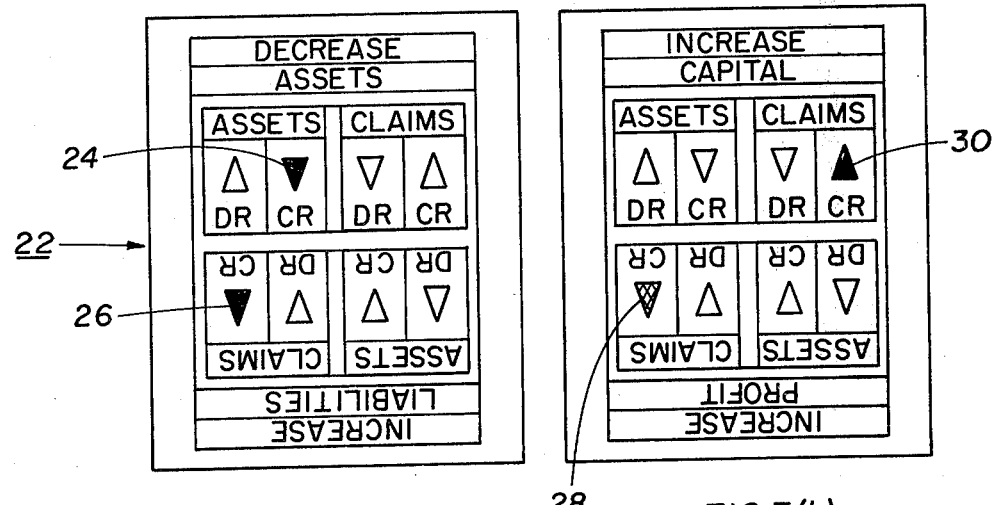

FIG. 3 illustrates both sides of a credit transaction card 22. Indicating arrowhead 24 demonstrates that a decrease in assets is to be posted on the credit or right side of the particular asset account. Similarly, indicating arrowheads 26, 28 and 30 demonstrate that increases in liabilities, capital or profit are to be credited or posted on the right side of the particular claims account.

Consequently, the composition of the indicating arrowhead not only demonstrates to the student where the entry is to be posted (i.e. debited or credited) but also whether such entry affects a permanent or temporary account.

In accordance with a first embodiment of the present invention, the transaction cards 12, 22 are "posted" in ledger pages 32 shown in FIG. 4. Ledger page 32 is generally rectangular in shape and contains a debit pocket 34 and a credit pocket 36 for receiving appropriate transaction cards 12. A slot 44 and companion window 42 is provided at the top of ledger page 32 to receive and display an insertable title tag 46. At the extreme left side of page 32 a crease or fold line 57 is provided to establish a rigid margin 59. A pair of spaced holes 56, 58 in said margin 59 may be used in conjunction with a ring binder (not shown) or ring fasteners 60 to join a plurality of ledger pages 32 into a ledger (see FIG. 5).

Each ledger page 32, in accordance with the present invention, functions as a "T" account. Debits are "posted" by inserting the appropriate transaction card 12 marked with the value 62 to be posted into debit pocket 34. Credits are similarly "posted" by inserting cards 12, appropriately marked, into credit pocket 36.

Title tag 46 contains the nature of the account 48, i.e. current asset, the title of the account 50, i.e. cash, and a pair of indicating arrowheads 52,54, one on each side of the account title, to aid the student in understanding on what side of the account increases or decreases are to be "posted". Once the title tag 46 is properly inserted in slot 44, the title of the account 50 and indicating arrowheads 52, 54 will be displayed through window 42.

Figure 7:
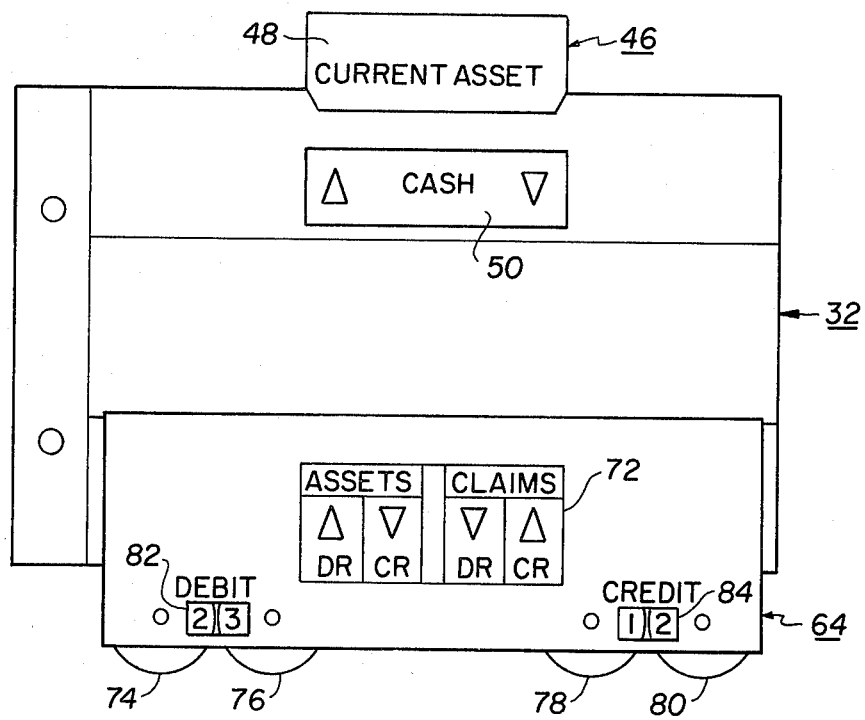
FIG. 7 shows the totalizer device of FIG. 6 positioned on a ledger page in accordance with a second embodiment of the present invention.
Figure 8:
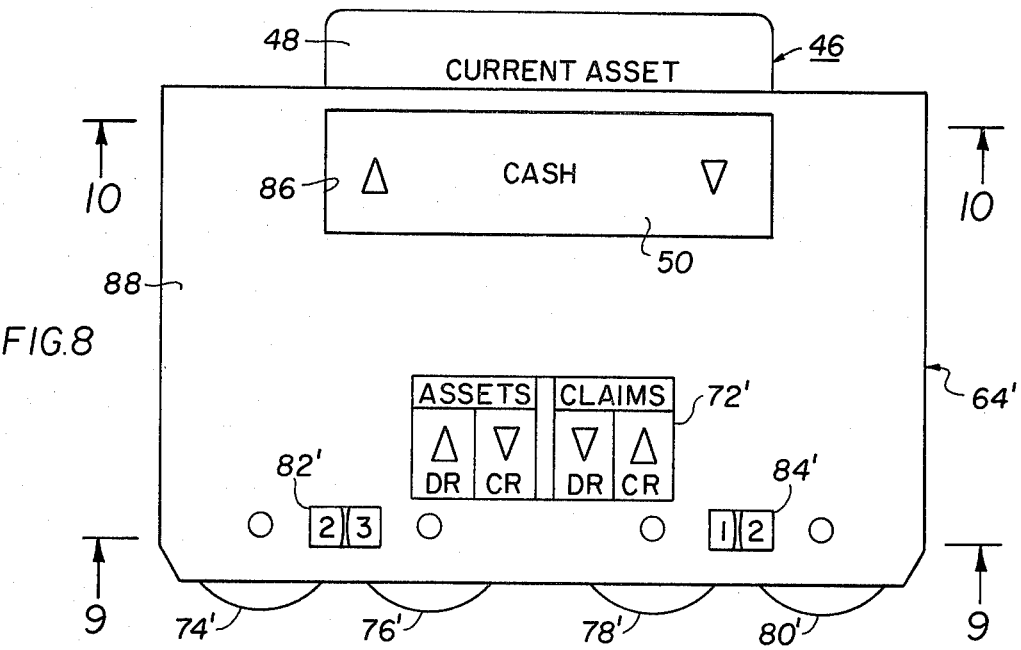
FIG. 8 illustrates the totalizer device of FIG. 6 adapted to receive an insertable title tag in accordance with a third embodiment of the present invention.
Figure 9:
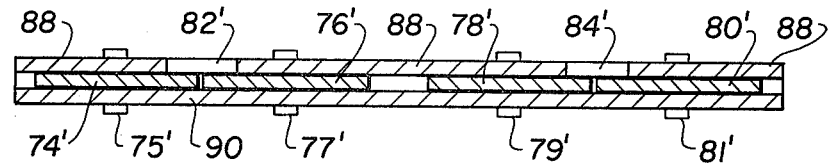
FIG. 9 is a section view, in elevation, taken along lines 9—9 of FIG. 8.
Figure 10:
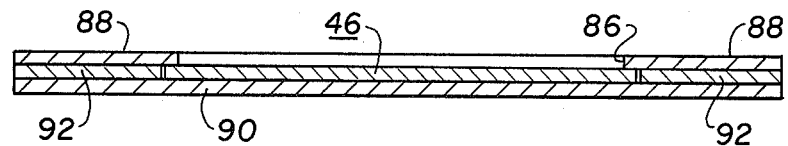
FIG. 10 is a section view, in elevation, taken along lines 10—10 of FIG. 8.

FIGS. 6 and 7 depict a second embodiment of the present invention. This embodiment similarly includes ledger page 32 and title tag 46 constructed in accordance with the above description. It is contemplated that once the student has mastered the art of "posting" the bookkeeping entries by use of appropriate transaction cards 12 inserted in the proper pockets of the particular accounts affected, he can advance to the use of the totalizer device 64 to "post" the entries without utilizing transaction cards 12.

Totalizer device 64 is substantially rectangular in shape with a centrally located crease or fold marking 66 which divides the device 64 into top and bottom portions 65, 67. The top portion 65 contains a slit 69 thereby creating a pair of tabs 68, 70. When top portion 65 is folded back behind bottom portion 67, the device may be attached to ledger page 32 by inserting tab 68 into debit pocket 34 and tab 70 into credit pocket 36. FIG. 7 illustrates the device 64 thus attached to ledger page 32.

Four disks 74, 76, 78, 80 are rotatably attached to bottom portion 67 by rivets 75, 77, 79, 81. Each disk has, on the face thereof, a circular series of numerals from 0 to 9 inclusive and protrudes slightly from the bottom edge of portion 67 in order that each disk may be conveniently turned by the fingers. On disks 74 and 78 the circular series of numerals progress in a clockwise order, while on disks 76 and 80 they are set forth in a counter-clockwise order. The numerals on disks 74 and 76 are exposed through sight window 82 and the numerals on disks 78 and 80 are similarly exposed through sight window 84. In accordance with the present invention, sight window 82 displays the total debit amount in the account with the exposed numeral on disk 76 representing units and the exposed numeral on disk 74 representing tens. Similarly, the total credit amount in the account is displayed through window 84 with the exposed numeral of disk 80 representing units and the exposed numeral of disk 78 representing tens.

In contrast to the first embodiment, instead of selecting appropriate transaction cards and marking same with the value to be "posted" and thereafter inserting such marked card into either the debit or credit pocket, the student merely rotates the appropriate disks until the proper numerals, representing the accumulated total, are brought into view through window 82, if debiting, or window 84, if crediting.

The bottom portion 67 of the totalizer device 64 contains a graphic representation 72 of the fundamental accounting equation with appropriate indicating arrowheads to demonstrate and remind the student that increases in assets are debited while increases in claims are credited.

In a third embodiment of the present invention, entries are "posted" directly onto an account totalizer device 64' without using ledger pages 32. The account totalizer device 64' is generally rectangular in shape having a face member 88 including window 86 and a backing member 90. Spacer member 92 is "sandwiched" between face member 88 and backing member 90 to provide a slot behind window 86 for receiving and displaying title tag 46. Similarly, the positioning of spacer member 92 provides a channel at the bottom edge of device 64' between face member 88 and backing member 90. Within this channel, four disks 74', 76', 78' and 80' are rotatably attached to face and backing members 88, 90 by means of rivets 75', 77', 79' and 81'. Each disk has, on the face thereof, a circular series of numerals from 0 to 9 inclusive, and protrudes slightly from the bottom edge of device 64' in order that each disk may be conveniently turned by the fingers.

The numerals on disks 74' and 76' are exposed through sight window 82' and the numerals on disks on disks 78' and 80' are similarly exposed through sight window 84'. The function and cooperation of disks 74', 76', 78' and 80' are similar to those previously explained in connection with FIGS. 6 and 7. Accordingly, sight window 82' displays the total debit amount in the account and window 84' displays the total credit amount in the account. As an aid to the student, a graphic representation 72' of the fundamental accounting equation with appropriate indicating arrowheads is printed or otherwise reproduced on face member 88.

The devices of the present invention may be used as either a teaching aid or an educational game. As a teaching device, in the teacher-student environment, the invention enables an instructor to develop a commercial account through a set of facts and the student, using the components of the invention, must accurately balance the transactions of the business for some stated accounting period. As an educational game, the invention contemplates the inclustion of preestablished fact patterns for a variety of business entities. Each player is given a copy of a specific fact pattern and the object of the game is to quickly and accurately post all transactions, close-out and balance all appropriate accounts and develop a profit and loss picture for the business in question. The first player to accurately complete the bookkeeping assignment is the winner. Answer sheets are provided corresponding to each fact pattern so the players may compare their results with the correct postings and balances.

To illustrate the use of the present invention as a teaching aid, the following transactions of one John Doe, a parking lot proprietor, will be explained, posted and closed-out using the components of the present invention. For the sake of brevity, this exercise will be explained in terms of the first embodiment of the present invention.

John Doe decided to buy a piece of land near the local railroad station to be used as a parking lot. First, he opened a bank account in the business name: John's Parking lot; and, deposited therein $24,000.00 to start his business. Mr. Doe thereafter bought the land desired for $20,00.00 drawn from the business account. During the first quarter of business Mr. Doe had borrowed a total of $6,000.00 and had received $12,000.00 in parking fees. In addition a total of $3,000.00 had been paid out in that period for various operating expenses including printing, advertising and interest on loans. A total of $4000.00 of the amounts borrowed was repaid during that period. Mr. Doe had withdrawn a total of $7000.00 from the business during that same quarter.

After a review of the fact pattern, the student will create the following account title tags, Cash, Land Notes Payable, Capital (John Doe), Parking Income, Expenses, Profit and Loss. These title tags will each be inserted into each of seven ledger pages constructed in accordance with the present invention.

The student will then commence to "post the entries" by selecting the appropriate transaction card, making a pencil notation thereon of the value of the transaction and inserting the card in the appropriate pocket of the ledger page for the account affected. Accordingly, the student will first select a transaction card indicating "Increase Assets" and mark that card: "$24,000.00" or, since all transactions are in the thousands, may shorten the notation of value to simply "24". This card will then be inserted into the debit pocket of the Cash account ledger page. Under the principles of double-entry bookkeeping, a second entry must be posted. The student will select a transaction card marked: "Increase Capital" and mark that card with the same value notation-"24". This card will be inserted into the credit pocket of the Capital account ledger page. This simple transaction illustrates one of the basic principles of accounting: you debit increases in assets and credit increases in capital. The construction of the ledger pages in accordance with the present invention further teaches that debits are "entered" in the left side and credits in the right side of the basic "T" accounts.

The student will then post the next transaction: the purchase of the land. He will select an "Increase Asset" transaction card and mark it: "20" and thereafter insert this card into the debit pocket of the Land account ledger page. A "Decrease Assets" card will be marked "20" and inserted into the credit pocket of the Cash account ledger page.

The borrowing of $6,000.00 will be "posted" by inserting a "Increase Assets" card marked "6" into the debit pocket of the Cash account ledger page and a "increase Liabilities" card marked "6" into the Notes Payable ledger page.

The teaching device of the present invention has, in these three simple transaction, graphically and physically illustrated the following accounting principles: (a) an increase in Assets will result in either an increase in Capital, an increase in Liabilities or a decrease in Assets; (b) an increase in Assets is debited; (c) an increase in Capital is credited; (d) an increase in Liabilities is credited; (e) a debit is made to the left side of the account and a credit is made to the right side of the account.

The student must next "post" the $12,000.00 received in parking fees. An "Increase Assets" card will be selected and marked "12" and thereafter inserted in debit pocket of the Cash account ledger page. The student will also select an "Increase Profit" card and similarly mark it "12" and insert the thus marked transaction card into the credit pocket of the Parking Income account ledger page.

In like manner, the $3,000.00 in expenses is "posted" by inserting an appropriate marked "Decrease Profit" card in the debit pocket of the Expense account ledger page and an appropriately marked "Decrease Assets" card in the credit pocket of the Cash account ledger page. To post the repayment of $4,000.00, the student will insert a "Decrease Liabilities" card, marked "4", into the debit pocket of the Notes Payable account ledger page and a "Decrease Assets" card, similarly marked "4", into the credit pocket of the Cash account ledger page.

Finally, the student will record Mr. Doe's withdrawal of $7,000.00 during the period. A "Decrease Capital" card, marked "7" is inserted in the debit pocket of the Capital (John Doe) account ledger page and a "Decrease Assets" card, marked "7" is inserted in the credit pocket of the cash account ledger page.

Thus, all transactions for the period under study have been "posted". The student must now balance each account. This is done by totalling the values appearing on the card in each pocket of an account ledger page and recording the difference—the excess of either debits or credits—on the appropriate pocket. If the debits exceed the credits in a particular account, the difference is called a "debit balance". The reverse situation yields a "credit balance" for the particular account. If all entries were properly made, the total of the debit balance will equal the total of all credit balances. If this "trial balance" criteria is satisfied, the student will close-out the temporary accounts to determine profit or loss for the business during the period under study.

In closing out a temporary account its balance must be brought to zero. Accordingly, a "Increase Profit" card marked "3" is inserted in the credit pocket of the Expenses account ledger page thereby bringing that account balance to zero. Under the principles of double-entry bookkeeping, the Profit and Loss summary account is debited by inserting a "Decrease Profit Loss" card marked "3" into the debit pocket of the account's ledger page. Similarly, Parking Income is debited and Profit and Loss is credited an equal amount: "12". After both temporary accounts are closed, the student will strike a balance for the Profit and Loss summary account. Under the facts in the example being considered, the Profit and Loss account results in a credit balance of "9", i.e. the business showed a profit of $9,000.00 during the period.

Since the Profit and Loss summary account is similarly a temporary account, it too must be closed-out and its balance transferred to the permanent Capital account. Consequently, in the manner heretofore explained, Profit and Loss is debited "9" and Capital (John Doe) is credited "9". The student may now prepare a post-closing trial balance which should compare favorably with that held by the instructor.

The foregoing description is intended to be merely illustrative of presently preferred embodiments of the present invention within an exemplary environment. A latitude of modification, change and substitution is intended wherein some features of the invention will be employed without a corresponding use of other features so described herein. Accordingly, various modes of carrying out the invention are contemplated as being within the scope of the following claims.

I claim:

1. A teaching device useful as an aid in teaching the rudimentary principles of accounting comprising:
   a. a plurality of rectangular transaction cards, each card bearing accounting indicia;
   b. a plurality of ledger pages, each page including, in juxtaposition, a left debit pocket and a right credit pocket for receiving appropriate transaction cards;
   c. a plurality of account title tags; and
   d. a slot at the top of each ledger page for receiving and displaying said title tag.

2. A teaching device according to claim 1 wherein said accounting indicia includes symbols indicating a bookkeeping entry as either an increase or decrease in Assets or an increase or decrease in Claims.

3. A teaching device according to claim 2 wherein said symbols include arrowheads, "CR" for credit and "DR" for debit.

4. A teaching device according to claim 1 wherein said slot includes at least one window therein for displaying the title of an account.

5. A teaching device according to claim 1 wherein each ledger page includes a pair of spaced holes at the extreme left side to facilitate the combining of several ledger pages into a ledger.

6. An education game embodying the rudimentary principles of accounting comprising:
   a. a plurality of rectangular transaction cards, each card bearing accounting indicia;
   b. a plurality of ledger pages, each page including, in juxtaposition, a left debit pocket and a right credit pocket for receiving appropriate trasaction cards;
   c. a plurality of account title tags; and
   d. a slot at the top of each ledger page for receiving and displaying said title tag.
   e. a plurality of fact pattern sheets, each fact pattern setting forth a business and several transactions for an accounting period that the players are to accurately post and thereafter close to determine profit or loss for that period.
   f. a plurality of answer sheets corresponding to said fact pattern sheets including accurate trial balances and the profit or loss the player should have obtained.

7. A teaching device useful as an aid in teaching the rudimentary principles of accounting comprising:
   a. a plurality of ledger pages, each page including, in juxtaposition, a left debit pocket and a right credit pocket;
   b. a plurality of account title tags;
   c. a slot and companion sight window at the top of each ledger page for receiving said title tag and displaying same through said window; and,
   d. a totalizer device having foldable tabs thereon for insertion into said pockets to thereby attach said totalizer to said ledger page.

8. A teaching device according to claim 7 wherein said totalizer includes means thereon for recording and displayikng the amounts debited and credited on said ledger page.

9. A teaching device according to claim 8 wherein said recording and displaying means includes: a plurality of rotatable disks, each disk having, on the face thereof, a circular series of numerals from 0 to 9 inclusive; and, a debit sight window and a credit sight window for displaying therethrough the numerals on said disks representing the accumulated debit and credit totals.

10. A teaching device useful as an aid in teaching the rudimentary principles of accounting comprising:
    a. a plurality of account totalizer devices;
    b. a plurality of account title tags;
    c. a slot and companion sight window at the top of each totalizer for receiving said title tags and displaying same through said window; and
    d. each of said totalizers including means thereon for recording and displaying the accummulated amounts debited and credited in the account.

11. A teaching device according to claim 10 wherein said recording and displaying means includes: a plurality of rotatable disks, each disk having, on the face thereof, a circular series of numerals from 0 to 9 inclusive; and, a debit sight window for displaying therethrough the numerals on said disks representing the accummulated debit and credit totals.

* * * * *